Patented Nov. 2, 1937

2,098,187

UNITED STATES PATENT OFFICE 2,098,187

ADHESIVE MATERIAL

Milton H. Kemp, Oak Park, Ill., assignor to The Kendall Company, Boston, Mass., a corporation of Massachusetts No Drawing. Application July 3, 1935,
Serial No. 29,642

11 Claims. (Cl. 134—17)

This invention relates to adhesives and particularly to rubber base adhesives of the type such as are commonly used in the manufacture of adhesive tape. Adhesives of this class are commonly described as being pressure sensitive, since they remain sticky under normal atmospheric conditions, and may be caused to adhere to a surface by the application of pressure alone without the use of either heat or moisture.

Rubber base adhesives of the class referred to are composed chiefly of a mixture of rubber and rosin. When rubber is properly masticated and mixed with rosin an emulsion is formed which is very plastic and sticky. This basic emulsion of rubber and rosin may be modified in various ways to give it the desired body and to control the degree of adhesion. One such modification is the product known as rubber adhesive, which consists of the basic rubber-rosin emulsion to which there has been added a filler, such as starch, orris root, lithopone, clay, barytes, etc., an additional plasticizer such as minerol oil, lanolin, etc., and a waxy ingredient such as beeswax, paraffin, etc. The waxy ingredients tend to reduce or tone down the stickiness. Another modification of the simple rubber-rosin emulsion is the product commonly referred to as zinc oxide adhesive, which consists of the rubber-rosin base, a second plasticizer such as mineral oil, a wax such as beeswax, and zinc oxide, the latter serving as a reenforcing filler to produce a very firm, tough cohesive mass which does not tend to string out when touched.

Much trouble has been encountered in the use of these rubber base adhesives because of their decided tendency to deteriorate under ordinary storage conditions. For example, a strip of rubber adhesive tape, when wound on a spool, and exposed to the air gradually loses its adhesive properties. In some instances the adhesive mass becomes hard and dry, losing its tack and adhesion. In other cases it tends to become extremely soft and mushy.

The object of my invention is to provide an adhesive material of the type referred to which will be highly resistant to these aging processes and hence capable of maintaining its original tack and adhesion after being exposed to the air for long periods of time.

As previously stated, a rubber base adhesive such as is used on surgical tape includes rosin as one of the main ingredients thereof. Rosin, as it occurs in nature, consists essentially of abietic acid, and the behavior of the rubber-rosin mixtures when exposed to the air is at least partially explained by the chemical characteristics of abietic acid. This is a rather complex acid of the aromatic series. According to the generally accepted formula, the abietyl radical contains three benzene rings in which there are two double bonds. These unsaturated bonds are rather prone to take up oxygen. For example, powdered rosin, when placed in a closed flask filled with oxygen, will readily absorb the oxygen and cause a drop in the gas pressure in the flask. It appears that the oxygen is absorbed at the unsaturated bonds of the abietyl radical and forms a peroxide.

As previously stated, when rubber is properly masticated and mixed with rosin, it becomes plastic and appears to form an emulsion. In ratios in which the rubber predominates, the emulsion appears to be one of rosin in rubber. Such an emulsion is very plastic and sticky. As the percentage of rosin in the mixture is increased, the emulsion tends to become less plastic, and when the rosin content is raised to about 70% or 80% the rubber appears to become dissolved in the rosin, with the result that the mass becomes tough and inelastic. Ordinarily the rosin is not used in an amount exceeding the amount of rubber used in the mixture. It can be clearly demonstrated that by substituting for an unoxidized rosin in a rubber base adhesive, a rosin which has been partially oxidized to the peroxide, the mass will become tough and much less sticky. In fact, if a rosin which has been oxidized to the extent of about 80% is used it will not even emulsify the rubber.

My experiments have demonstrated that the aging qualities of a rubber base adhesive may be remarkably enhanced by substituting for ordinary rosin, in the rubber-rosin mixture, a rosin which has been treated so as to render it resistant to oxidation under ordinary atmospheric conditions. Oxidized rosin, that is, rosin in which the unsaturated bonds of the abietic acid have been removed by addition of oxygen, to form the peroxide, would, of course, not be suitable because as hereinbefore explained, it is the formation of this peroxide which appears to destroy the tack and adhesion. I have found, however, that rosin in which the unsaturated bonds of the abietic acid have been removed by addition thereto of a substance other than oxygen, is substantially unaffected by the atmospheric oxygen. For example the addition of hydrogen to these unsaturated bonds will render ordinary oxidizable rosin highly resistant to oxidation even when exposed to the air for months in powdered form.

Furthermore I have discovered that rosin, when so treated, has the ability to emulsify the rubber to produce an adhesive mass which has adequate tack and adhesion. Because of the non-oxidizability of the rosin ingredient, such a mixture has aging qualities which are far superior to those possessed by a mixture of rubber and ordinary oxidizable rosin. This is true not only with respect to preservation of tack and adhesion but also with respect to retention of the original firmness of the mass. This latter feature is quite important in the case of surgical adhesive tape, for it tends to prevent sticking of the adhesive to the backing material when wound on a spool. Also the greater the firmness of the adhesive, the less tendency there is for displacement of the tape from a fixed position on a surface to which it has been applied.

A further possible explanation for the desirable effect obtained by the use of a saturated rosin, such as hydrogenated rosin, in lieu of oxidizable rosin, in the manner hereinbefore explained, may be found in the fact that the hydrogenated rosin seems to reduce the rate of oxidation of the rubber. In rubber adhesive mixtures containing ordinary rosin the formation of the peroxide of abietic acid appears to have a definite catalytic effect upon the oxidation of the rubber. To the extent that the rosin is hydrogenated, formation of this peroxide is avoided, and oxidation of the rubber is proportionately reduced.

It should be stated that although hydrogenated rosin is the preferred plasticizing and emulsifying ingredient for the rubber, the invention is not restricted to the use of hydrogenated rosin. Other compounds containing an unsaturated resinic radical which may be treated to partially or wholly remove the unsaturated bonds may, after such treatment, be used in lieu of hydrogenated rosin. Among such compounds may be mentioned abietic acid, Burgundy pitch, rosin oil, pimaric acid, and the esters of abietic acid such as methyl abietate, ethyl abietate, and glycerol abietate (ester gum).

Resinous products obtained from any of the members of the family of trees known as the Pinaceae family are particularly suitable for use as a source of the rubber-emulsifying ingredient for purposes of my invention.

I wish to add that it is not necessary to use rosin, or its equivalent, which has been 100% saturated. A sample of rosin having about 69% of the double bonds saturated with hydrogen, showed no oxidized material after being exposed to the air for six months in a powdered condition. A rubber adhesive made from a rosin hydrogenated to this extent is very satisfactory, and incomparably better than the present day product. Also, if desired, the hydrogenated product may be used in the mixture in conjunction with desired amounts of the untreated product.

In practice the improved adhesive material may be made by substantially the same process which is now used in making ordinary adhesive. The rubber is first plasticized on a roll mill until smooth, and the non-oxidizable rosin is then added, and the mass worked until emulsified, after which the desired waxes and fillers are added and the mixing continued until the latter ingredients are thoroughly dispersed through the mass. In making an adhesive tape the adhesive mass thus prepared may be applied to the cloth or paper backing by an ordinary calendering or spreading operation.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. An adhesive material highly resistant to aging containing rubber and a plasticizer in such relative amounts and of a character to provide a plastic sticky mass, the plasticizer consisting essentially of one or more compounds selected from a group consisting of those containing a resinic acid radical treated to partially or wholly remove the unsaturated bonds thereof by saturation with hydrogen.

2. A pressure-sensitive adhesive composition highly resistant to aging containing rubber and a plasticizer comprising a compound selected from a group consisting of those containing a resinic acid radical treated to partially or wholly remove the unsaturated bonds thereof by saturation with hydrogen, said hydrogenated resinic acid being present in an amount sufficient to materially inhibit oxidation of the composition by aging.

3. A pressure-sensitive adhesive composition highly resistant to aging containing rubber and a plasticizer comprising a compound selected from a group consisting of those containing an abietic acid radical treated to partially or wholly remove the unsaturated bonds thereof by saturation with hydrogen, said hydrogenated abietic acid being present in an amount sufficient to materially inhibit oxidation of the composition by aging.

4. A pressure-sensitive adhesive composition highly resistant to aging containing rubber and a plasticizer containing a resinic acid radical treated to partially or wholly remove the unsaturated bonds thereof by saturation with hydrogen, said hydrogenated resinic acid being present in an amount sufficient to materially inhibit oxidation of the composition by aging; and an additional plasticizer.

5. A pressure-sensitive adhesive composition highly resistant to aging containing rubber and a plasticizer comprising a compound selected from a group consisting of those containing a resinic acid radical, obtained from the Pinaceae tree family, said radical being treated to partially or wholly remove the unsaturated bonds thereof by saturation with hydrogen, said hydrogenated resinic acid being present in an amount sufficient to materially inhibit oxidation of the composition by aging.

6. A pressure-sensitive adhesive composition highly resistant to aging containing rubber and rosin, the latter having been rendered substantially non-oxidizable through saturation of the double bonds thereof by a process of hydrogenation and being present in an amount sufficient to materially inhibit oxidation of the composition by aging.

7. A pressure-sensitive adhesive composition highly resistant to aging containing rubber, rosin and hydrogenated rosin, the latter being present in an amount sufficient to materially inhibit oxidation of the composition by aging.

8. A pressure-sensitive adhesive composition highly resistant to aging containing rubber, a plasticizer comprising hydrogenated rosin and an additional plasticizer, the hydrogenated rosin being present in an amount sufficient to materially inhibit oxidation of the composition by aging.

9. A pressure-sensitive adhesive composition highly resistant to aging containing rubber, a plasticizer comprising hydrogenated rosin, an additional plasticizer and a re-enforcing filler, the hydrogenated rosin being present in an amount sufficient to materially inhibit oxidation of the composition by aging.

10. A pressure-sensitive adhesive composition highly resistant to aging containing rubber and hydrogenated methyl abietate, the latter being present in an amount sufficient to materially inhibit oxidation of the composition by aging.

11. A pressure-sensitive adhesive composition highly resistant to aging containing rubber and hydrogenated glycerol abietate, the latter being present in an amount sufficient to materially inhibit oxidation of the composition by aging.

MILTON H. KEMP.